US012022601B2

(12) United States Patent
Reszke et al.

(10) Patent No.: US 12,022,601 B2
(45) Date of Patent: Jun. 25, 2024

(54) ADAPTER SHAPING ELECTROMAGNETIC FIELD, WHICH HEATS TOROIDAL PLASMA DISCHARGE AT MICROWAVE FREQUENCY

(71) Applicant: APAN INSTRUMENTS sp. Z o.o., Olsztyn (PL)

(72) Inventors: Edward Reszke, Wroclaw (PL); Krzysztof Jankowski, Warsawa (PL); Andrzej Ramsza, Warsawa (PL)

(73) Assignee: APAN INSTRUMENTS sp. Z o.o. (PL)

( * ) Notice: Subject to any disclaimer, the term of this patent is extended or adjusted under 35 U.S.C. 154(b) by 0 days.

(21) Appl. No.: 16/091,479

(22) PCT Filed: Mar. 28, 2017

(86) PCT No.: PCT/PL2017/000032
§ 371 (c)(1),
(2) Date: Oct. 4, 2018

(87) PCT Pub. No.: WO2017/176131
PCT Pub. Date: Oct. 12, 2017

(65) Prior Publication Data

US 2019/0159329 A1 May 23, 2019

(30) Foreign Application Priority Data

Apr. 5, 2016 (PL) ........................................ 416758

(51) Int. Cl.
*H05H 1/30* (2006.01)
*H05H 1/46* (2006.01)

(52) U.S. Cl.
CPC ................ *H05H 1/30* (2013.01); *H05H 1/46* (2013.01); *H05H 1/463* (2021.05)

(58) Field of Classification Search
CPC .. H05H 1/26; H05H 1/30; H05H 1/32; H05H 1/34; H05H 1/42; H05H 1/46;
(Continued)

(56) References Cited

U.S. PATENT DOCUMENTS 4,902,099 A * 2/1990 Okamoto .............. G01N 21/73 219/121.36
4,908,492 A * 3/1990 Okamoto ................ H05H 1/46 118/723 MR (Continued)

FOREIGN PATENT DOCUMENTS

EP 1421832 A1 5/2004
JP H11 162694 A 6/1999

(Continued)

*Primary Examiner* — Sang Y Paik
(74) *Attorney, Agent, or Firm* — Leading Edge Law Group

(57) ABSTRACT

The adapter shaping an electromagnetic field heats toroidal plasma discharge. It is intended for use in plasma torches dedicated for excitation/ionization sources in spectrometers. The adapter includes at least two electromagnetic field shaping elements, which are stretched between the bushing of the upper microwave connection and the bushing of the lower microwave connection. An element shaping electromagnetic field is positioned to the surface pitch of the bushings at an angle ranging from 0 to 90 degrees.

8 Claims, 2 Drawing Sheets

(58) Field of Classification Search
CPC ..... H05H 2001/4607; H05H 2001/463; H05H 1/48; H05H 1/50
USPC ........................................ 219/121.36–121.44
See application file for complete search history.

(56) References Cited

U.S. PATENT DOCUMENTS

| | | | | |
|---|---|---|---|---|
| 5,086,255 | A | 2/1992 | Okamoto | |
| 5,537,004 | A * | 7/1996 | Imahashi | H01J 37/32678 315/111.41 |
| 2003/0111445 | A1 | 6/2003 | Hammer | |
| 2004/0262268 | A1 | 12/2004 | Wu | |
| 2010/0072910 | A1 | 3/2010 | Espiau | |
| 2015/0373825 | A1 | 12/2015 | Jankowski | |
| 2016/0029472 | A1 | 1/2016 | Jevtic | |

FOREIGN PATENT DOCUMENTS

| | | | |
|---|---|---|---|
| PL | 408615 | A1 | 12/2015 |
| WO | 2005025281 | A1 | 3/2005 |
| WO | 2006031010 | A1 | 3/2006 |

* cited by examiner

ADAPTER SHAPING ELECTROMAGNETIC FIELD, WHICH HEATS TOROIDAL PLASMA DISCHARGE AT MICROWAVE FREQUENCY

CROSS-REFERENCE TO RELATED APPLICATIONS

See also Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The invention relates to an adapter forming a microwave electromagnetic field heating toroidal plasma discharge intended for use as a plasma excitation source in spectrometry applications.

2. Description of Related Art Including Information Disclosed Under 37 CFR 1.97 and 37 CFR 1.98

A rotating plasma excitation source is known from the Polish patent P.08615. The torch consists of the inner tube positioned coaxially with the outer tube and at least three electrodes, whose ends are equally distributed around the torch axis and placed within the outer tube. Equally spaced slots are created at the end of the outer tube for electrodes to pass through, as they extend parallel to the axis of the torch beginning at the end edge of the outer tube. In addition, the torch assembly includes a cylindrical cup adapted to the outer diameter of the outer tube, which contains the same number of slots for the electrodes. In another rendition, the torch features at least six electrodes arranged in two planes perpendicular to its axis. The cap here has the same number of slots, wherein the depth of every other slot is equal to the distance between the planes.

The microwave-induced plasma source known from U.S. Pat. No. 5,086,255, features a coaxial waveguide formed by the inner and outer conductors, wherein the inner conductor is formed in a coil spiral, an axially placed tube serves to introduce plasma-forming gas, and an a coaxially placed tube serves as the sample inlet. The tubes are placed in a chamber, which the cooling gas is fed to, flowing parallel to the axis of the tubes in the microwave cavity, which the coaxial waveguide is connected to, feeding microwave energy. A shield is used to prevent possible leakage of microwave energy from the coaxial waveguide. A mass spectrometer is placed on the reverse of the shield to carry out measurements of ions emitted from the plasma, which the microwave induced plasma source produces.

Another plasma source known from the U.S. Pat. No. 6,683,272 patent is intended for use in spectrochemical analysis of samples by applying plasma induced by microwave energy. The source consists of a rectangular waveguide fed by microwave power of the 'I'E10 type. Plasma torch passes through the cavity and is placed coaxially to the magnetic field at its maximum.

The plasma torch using microwave excitation described in EP 1421832 features single-layer coaxial winding around the discharge tube, a cavity coaxial with the outer shield and plasma axis, a coaxial inner conductor suitable for the transmission of microwaves to the plasma torch area, with parameters such as impedance and transmission bandwidth taken into account, even in conditions of significant pressure variations in the process gas, which could affect plasma conductivity. Said plasma torch enables stable plasma generation and very good post-tuning ignition and re-ignition properties.

In the book "Microwave induced plasma analytical spectrometry". RSC Monograph Series 2011, Jankowski and Reszke describe microwave plasma cavities used as plasma sources in materials engineering, as light sources—EDL (electrode-less discharge lamp), as well as excitation sources in emission spectroscopy, and—finally—as a source of ionization in mass spectroscopy. Over the course of the past 5 decades, designers have been offering a variety of models of microwave plasma cavities. However, the optimized plasma sources ICP (inductively coupled plasma) operating at radio frequencies with H-field type coupling have proven most effective and have practically dominated the commercial spectrometer market, despite their disappointingly high consumption of expensive atomic gases of high purity and the difficulty in obtaining low energy discharges in molecular gases. Molecular gas plasma can be maintained relatively easily at microwave frequencies, but there remain serious technical problems when it comes to obtaining discharge of toroidal geometry, i.e. one, where a cooler channel can be maintained at the plasma axis. Such plasma geometry proves to be the optimal one, as it allows for the best signal-to-noise ratio. Practically all constructions of microwave sources have been based on the electrical field excitation of ionized gas relative to the axial field component along the plasma column. In such configurations, the energy density in the plasma is limited due to possible wave propagation along the plasma column. Placing the plasma in a magnetic field with such a configuration would present a solution to mis this problem, but the only natural generator of the symmetrical H-field configuration could be provided by a circular TE011-type resonator, whose minimum dimension would have to exceed 6 cm providing that, at microwave S heating band, at the wavelength, is ca. 12 cm. Moreover, resonator tuning would have to involve changing its diameter. It is for these reasons that such plasma cavity structures have been rendered rather impractical.

As was shown in the U.S. Pat. No. 6,683,272B2 patent, one can obtain a focused field with a dominant magnetic component in a rectangular waveguide with a fundamental mode of oscillations. A more compact structure, which represents a development of the E-field cavity concept, is described in the USS0862S5 U.S. Pat. No. 5,086,255 patent, where an inductor is incorporated as a compact extension of the inner conductor of the coaxial-to-waveguide transition. Implementing this solution however, for any acceptable discharge tube diameters, has proven impractical, and the best analytical results were only obtained in configurations, where plasma excitation takes place without the participation of an inductor. Limitations arise mostly from the tact fact that practical discharge tube diameters are usually greater man than 10 mm. At such diameters, the length of even a single turn solenoid nears one quarter of the wavelength, which implies a change in the current amplitude from zero to 100%, resulting in major asymmetry of agitation. The Jankowski and Reszke publication “Microwave induced plasma analytical spectrometry”, RSC Monograph Series 2011, describes also other methods of generating toroidal plasmas, such as those using a so-called loop-gap resonator known from EPR spectroscopy, as well as dielectric resonators known also from lighting technology. A practical design of an excitation source using a dielectric resonator, labeled MICAP (Microwave Inductively Coupled Atmospheric Plasma) is proposed in the US2016029472 patent application.

BRIEF SUMMARY OF THE INVENTION

The essence of the adapter described here consist in herein consists of having at least two elements forming the electromagnetic field, stretched between the lower and the upper microwave coupling connection bushings, where the shaping of the electromagnetic field is relative to the sloping of the field shaping elements against the pitch surface generator, at angles in the range of 0 to 90 degrees. Advantageously, the lower connection bushing is equipped with a microwave connector fastened (e.g. screwed) immediately to the inner wire of the coaxial line.

Advantageously, the upper microwave connection bushing is permanently attached to the lower microwave connection bushing by means of elements shaping the electromagnetic field in the form of mutually parallel electric conductive rods.

Advantageously, the rods are spiral in shape. Advantageously, the bushing of the upper terminal of the microwave connection is integrated with the bushing of the lower connection by means of microwave electromagnetic field shaping elements in the form of mutually parallel rings (metallic washers), with dielectric spacers (dielectric washers) in between.

Advantageously, the electromagnetic field shaping elements mounted between the lower and the upper bushing ports of die microwave connections are made from a metal tube, where the elements are formed by means of cutting (or milling) the metal tube wall.

Advantageously, the magnetic field forming means, mounted between the lower and the upper bushing ports of the microwave connection are applied to the surface of the dielectric cylinder in the form of a metal layer by means of cladding (metallization).

Advantageously, the bushings between the magnetic field shaping elements are formed by vertical cuts (e.g. by milling).

The presently proposed adapter shaping the microwave electromagnetic field heating toroidal plasma discharge enables the formation of the discharge by coupling the H-type energy to the plasma, while ensuring maximum possible precision of axial symmetry of excitation. In an extremely different scenario, instead of discharge in H field, it is possible to excite the discharge using the E-type electric field, structured accordingly through the employment of parallel ring washers. Owing to these structuring washers, the electric field strength at the plasma surface remains substantially higher than that at its axis, as is in the case with H-type stimulation, where the field strength at the plasma axis by definition assumes minimum value. Adapters used for appropriate field shaping could in fact be conceived of as an integral part of the resonant cavity. There would be great difficulty, however, in constructing a plasma system with a number of current conductors, which have to assure symmetry of plasma excitation in a configuration similar to lumped circuits with inductors and capacitors and integral to microwave resonant cavities with distributed parameters. Such a model could perhaps become more attainable through complex 3D printing. At the present moment, advantages must be appreciated in the introduction of field forming adapters conceived of as external elements, lumped and coupled with original microwave cavity constructions. Such adapters can be employed in existing plasma cavity structures and appropriately optimized towards targeted plasma dimensions, shape and density, based on different working gases.

BRIEF DESCRIPTION OF THE SEVERAL VIEWS OF THE DRAWINGS

The invention is illustrated by figures.

DETAILED DESCRIPTION OF THE INVENTION

Example 1

Figure 1:
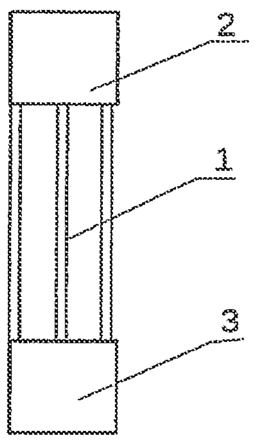
FIG. 1 is a schematic view of an adapter with four vertical electromagnetic field-forming elements made of electric conductive rods (wires).
Figure 2:
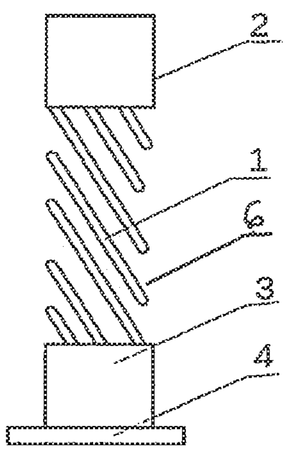
FIG. 2 is a schematic view of an adapter with EM field-forming elements consisting of six sections of spirals.
Figure 3:
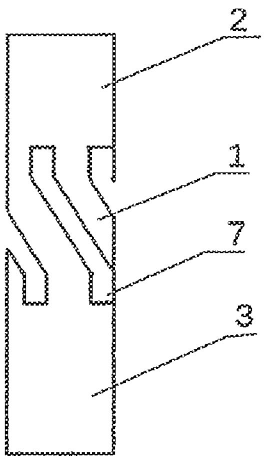
FIG. 3 is a schematic view of an adapter with oblique electromagnetic field-forming elements consisting of four spiral components formed by cutting or applying metal cladding on a dielectric cylinder (metallization).
Figure 4:
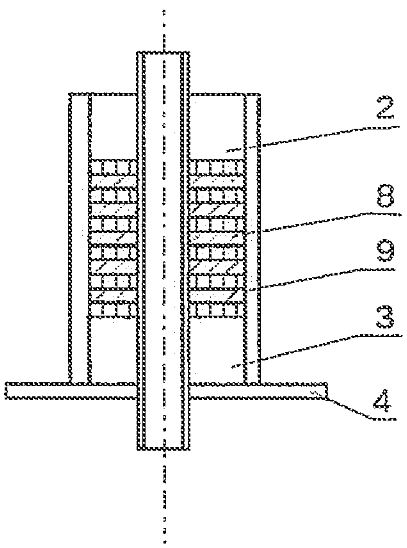
FIG. 4 is a schematic view of an adapter with electromagnetic field-forming elements in the shape of mutually parallel rings (washers), separated by dielectric spacers.
Figure 5:
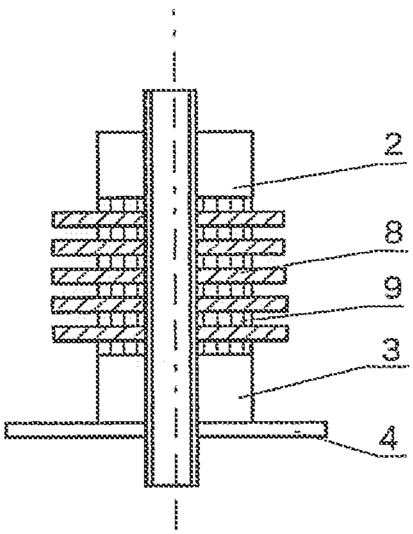
FIG. 5 is a schematic view of an adapter with electromagnetic field-forming elements in the shape of mutually parallel rings (washers), separated by dielectric spacers.
Figure 6:
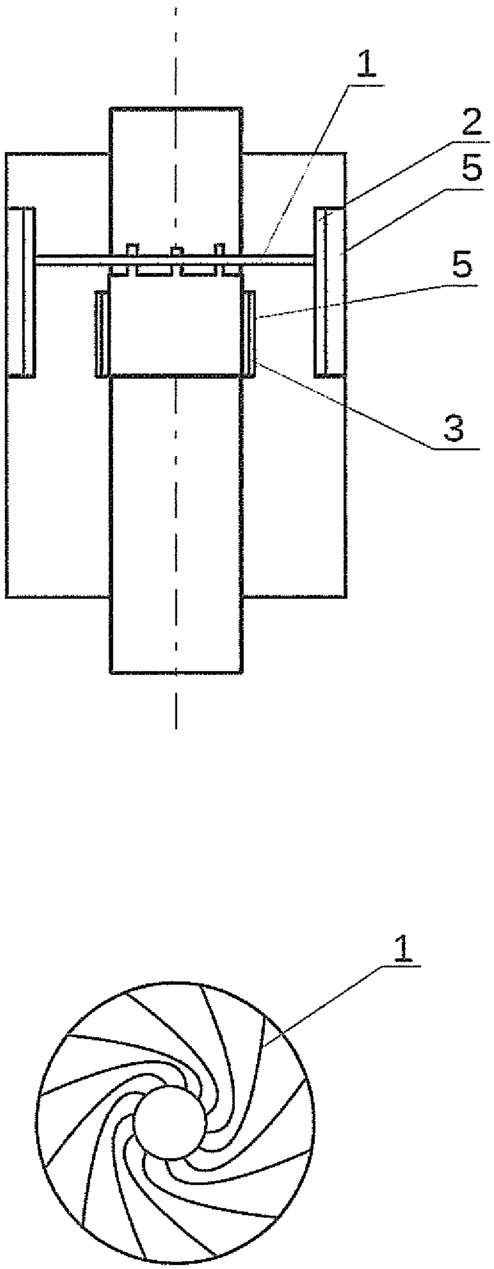
FIG. 6 is a schematic view of an adapter with electromagnetic field-forming elements of the electromagnetic field shaping comprising of spiral components perpendicular to the pitch surface generation of the bushing.

An adapter for shaping microwave electromagnetic field heating toroidal plasma discharge features four mounted magnetic field-forming elements 1 between the upper bushing 2 and the lower bushing 3 or lower microwave connector. The four elements are positioned at an angle of 0 degrees to a plasma surface pitch generator or generatrix 1A along a common bushing axis 1B of the lower bushing 3 and the upper bushing 2. In this embodiment, the electromagnetic field-forming elements 1 appear as mutually parallel electrical conductive rods (wires).

Example 2

An adapter shaping microwave electromagnetic field heating toroidal plasma discharge performs as in Example 1, except here the magnetic field-forming elements are six sections of helices, inclined relatively to the pitch surface generator of the bushing 2, 3.

Example 3

An adapter shaping microwave electromagnetic field heating toroidal plasma discharge performs as in Example 1, but here the magnetic field forming elements consist of 6 parallel washers arranged at an angle of 90 degrees to the pitch surface generator of the bushing 2, 3.

Example 4

An adapter shaping microwave electromagnetic field heating toroidal plasma discharge performs as in Example 1 or Example 2, but here, the lower bushing of microwave connection 3 is equipped with an external flat connector 4, which positions the adapter within the microwave cavity.

Example 5

An adapter shaping microwave electromagnetic field heating toroidal plasma discharge performs as in Example 1 or Example 2, but the field shaping elements 1 stretched between the upper bushing of microwave connection 2 and the lower bushing of microwave connector 3 are made from a tube, where the electromagnetic field forming elements 1 are curved through milling. In addition, between the elements shaping the electromagnetic field 1, vertical cutouts 7 are made in the bushings 2, 3.

Example 6

An adapter shaping microwave electromagnetic field heating toroidal plasma discharge performs as in Example 1 or Example 2, but the elements forming the electromagnetic field 1 between the bushing upper connection of the microwaves 2 and the bushing lower connection of microwaves 3 are applied through metallization i.e. applying the metal form immediately to the surface of the dielectric cylinder.

Example 7

An adapter shaping microwave electromagnetic field heating toroidal plasma discharge performs as in Example 1 or Example 2. However, in the bushings 2, 3 between the field forming elements, vertical cuts 7 are made.

Example 8

An adapter shaping microwave electromagnetic field heating toroidal plasma discharge performs as in Example 1 or Example 2, except that the upper bushing of the microwave connection 2 is permanently connected to the lower bushing connection of the microwave connection 3 by means of electromagnetic field forming elements 1 appearing in the shape of mutually parallel rings (washers) 8, with dielectric spacers 9 between them, where the diameters of the ring washer 8 and the spacer dielectric spacers 9 are equal.

Example 9

An adapter shaping microwave electromagnetic field heating toroidal plasma discharge performs as in Example 8, except that the diameters of the ring washers 8 are larger than those of the dielectric spacers 9.

LIST OF REFERENCES IN FIGURES

1. field forming element,
2. bushing of upper microwave connection,
3. bushing of lower microwave connection,
4. external flat connection,
5. isolator layer,
6. microwave cavity,
7. the cut,
8. ring washer,
9. dielectric spacer distance washer.

We claim:

1. An adapter for shaping a microwave electromagnetic field from a microwave electromagnetic field generator, comprising a lower microwave connector bushing having a longitudinal axis removably positioned within a microwave cavity of the microwave electromagnetic field generator;

an upper microwave connector bushing connected with said lower bushing in spaced coaxial relation; and at least three equally spaced identical electromagnetic field shaping elements connected in parallel with said upper and lower microwave connector bushings and arranged symmetrically within said microwave cavity between said upper and lower microwave connector bushings, wherein each electromagnetic field shaping element is positioned at an angle to a plasma surface pitch generatrix along said longitudinal axis ranging from greater than 0 degrees to 90 degrees to define a spiral configuration relative to said longitudinal axis and generate a toroidal plasma discharge within said microwave cavity by the electromagnetic field shaped by said at least three electromagnetic field shaping elements in order to heat the plasma discharge evenly from all circumferential directions relative to said longitudinal axis.

2. The adapter of claim 1, wherein said lower microwave connector bushing includes a cylindrical external connection.

3. The adapter of claim 1, wherein said upper microwave connector bushing is fixed to said lower microwave connector bushing, and wherein said at least three electromagnetic field shaping elements comprise electrically conductive rods.

4. The adapter of claim 3, wherein said upper and lower microwave connector bushings and said rods comprise a dielectric cylinder including a metal layer surface.

5. A method for using a microwave electromagnetic field shaping adapter suitable for heating a toroidal plasma discharge, the adapter comprising at least three equally spaced electromagnetic filed shaping elements connected in parallel with upper and lower microwave connector bushings and arranged symmetrically within a microwave cavity having a longitudinal axis, the at least three parallel electromagnetic field shaping elements being stretched between the upper microwave connector bushing and the lower microwave connector bushing and positioned relative to the generatrix of the upper and lower microwave connector bushings along said longitudinal axis at an angle ranging from greater than 0 degrees to 90 degrees to define a spiral configuration relative to the longitudinal axis, comprising the step of inserting the adapter as a replaceable element into a common microwave induced plasma cavity to generate a toroidal plasma discharge by the electromagnetic field shaped by said electromagnetic field shaping elements in order to heat the plasma discharge evenly from all circumferential directions relative to the longitudinal axis.

6. The method as defined in claim 5, wherein the lower microwave connector bushing includes a cylindrical external connection.

7. The method as defined in claim 5, wherein the upper microwave connector bushing is fixed with the lower microwave connector bushing and said field shaping elements comprise electrically conductive rods, respectively.

8. The method as defined in claim 7, wherein the electromagnetic field shaping elements and the upper and lower microwave connector bushings are fabricated on the surface of a dielectric cylinder as a metal layer applied by metallization.

* * * * *